A. V. LEGGO.
RABBLE FOR ORE ROASTING FURNACES.
APPLICATION FILED SEPT. 28, 1908.

940,537.

Patented Nov. 16, 1909.

3 SHEETS—SHEET 1.

Fig. 2ª.

Witnesses:

Inventor
Arthur V. Leggo
By
James L. Norris
Atty.

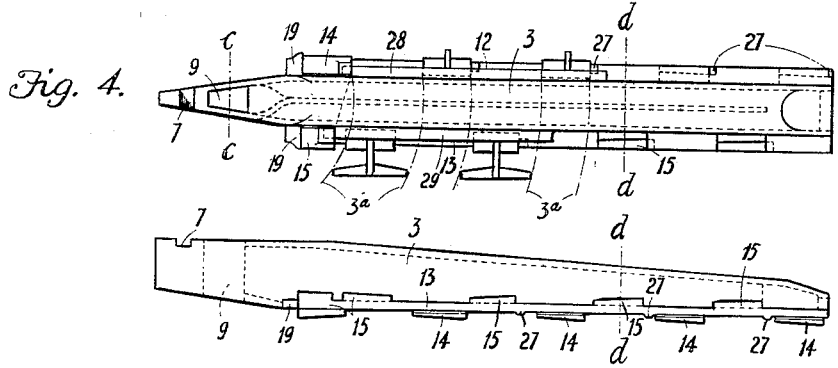
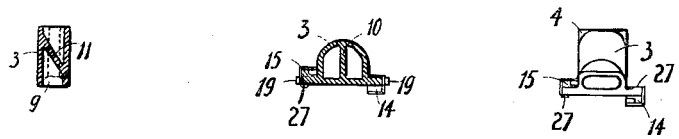
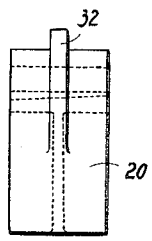 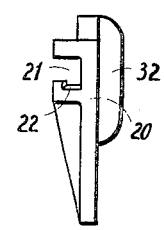 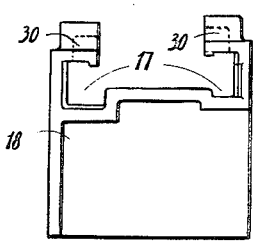
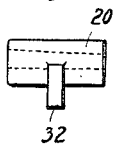 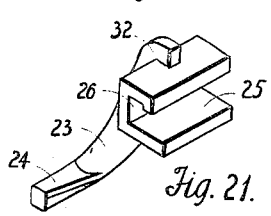 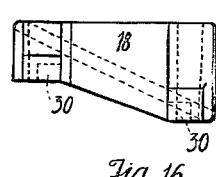
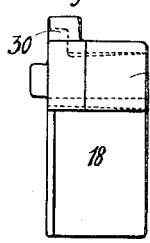 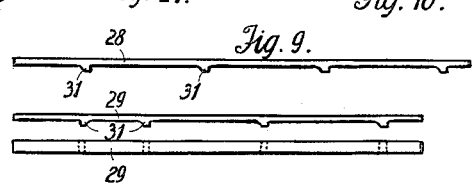

A. V. LEGGO.
RABBLE FOR ORE ROASTING FURNACES.
APPLICATION FILED SEPT. 28, 1908.
940,537.
Patented Nov. 16, 1909.
3 SHEETS—SHEET 3.
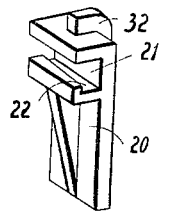
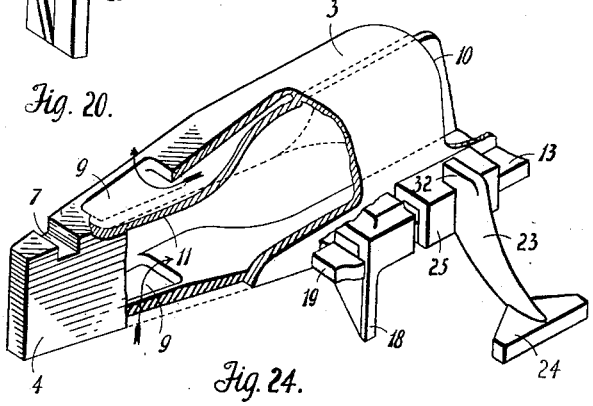
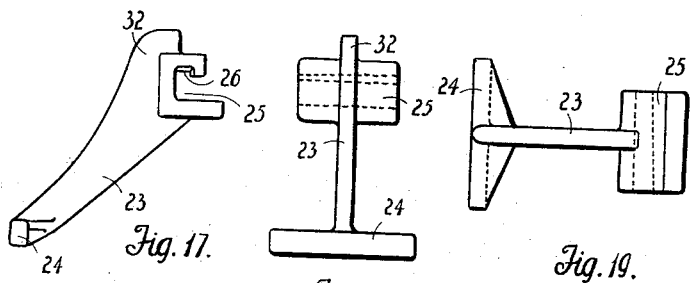
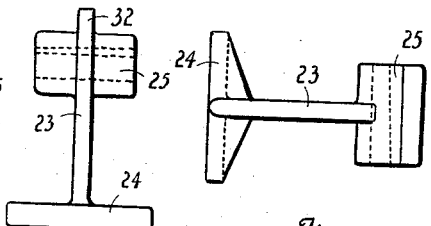
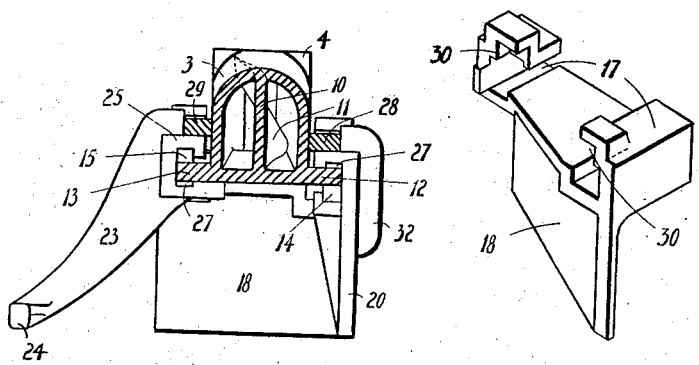
Inventor
Arthur V. Leggo
By
James L. Norris.
Atty.

UNITED STATES PATENT OFFICE.

ARTHUR VICTOR LEGGO, OF ST. KILDA, VICTORIA, AUSTRALIA.

RABBLE FOR ORE-ROASTING FURNACES.

940,537.   Specification of Letters Patent.   Patented Nov. 16, 1909.

Application filed September 28, 1908. Serial No. 455,210.

*To all whom it may concern:*

Be it known that I, ARTHUR VICTOR LEGGO, a subject of the King of Great Britain, residing at "Pendeen," York street, St. Kilda, in the State of Victoria and Commonwealth of Australia, have invented certain new and useful Improvements in Rabbles for Ore-Roasting Furnaces, of which the following is a specification.

This invention relates to certain improvements in rabbles for ore roasting furnaces.

The objects of the invention are to provide rabbles which will most effectively stir the ore being roasted, the whole or any part of which can be quickly put into or taken from their working position in the furnace, without the necessity of first allowing the furnace to cool down; which can be simply and economically made so as to combine a maximum amount of strength with a minimum amount of weight, and which for cheapness can be made of cast iron and all of the parts fitted together "black" that is without any machining.

The invention also comprises several novel features in the construction of the teeth to be affixed to the arms of the rabbles, and in the means devised for attaching the same thereto.

Figure 1:
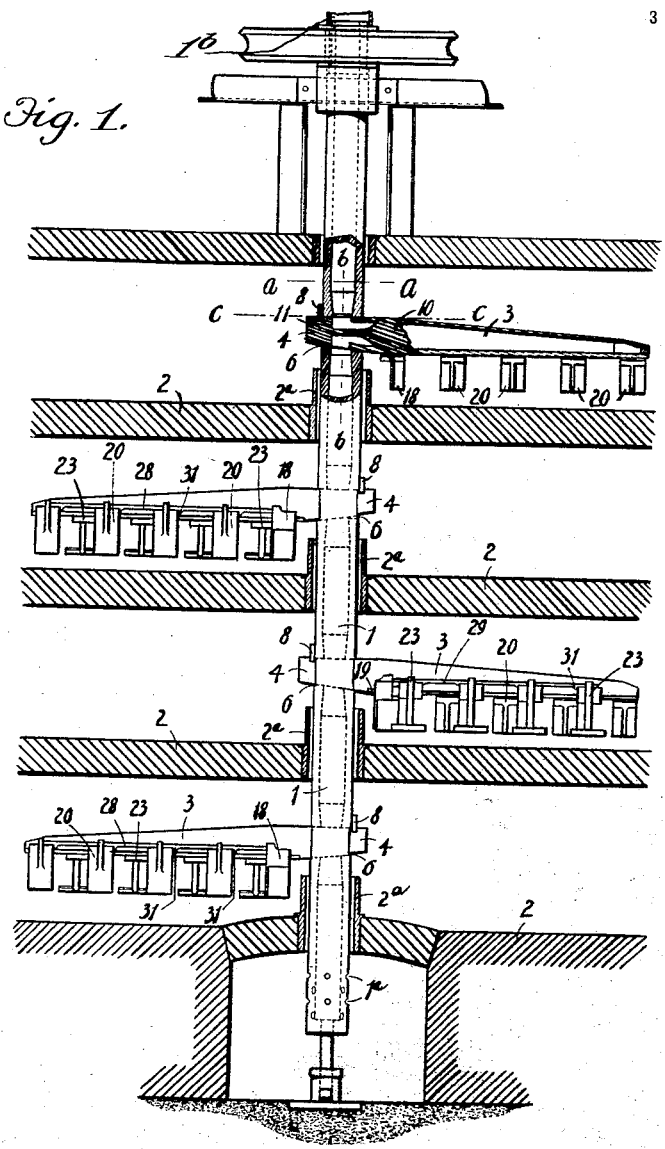
Figure 2:
Figure 2:
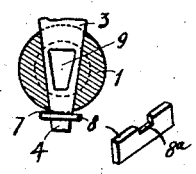
Figure 3:
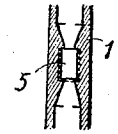

Referring to the drawings hereto annexed in which the same reference numerals indicate like parts in all the figures, Figure 1 represents portion of a multiple hearth furnace showing a rabble constructed according to my invention. Fig. 2 is a cross section of the rabble shaft shown in Fig. 1 on the dotted line *a a* and drawn to a larger scale, while Fig. 2ª is a cross section of the rabble shaft shown in Fig. 1 on the dotted line *c c* drawn to a larger scale than the said figure. Fig. 3 is a vertical section of the same shaft on the dotted line *b b*. Figs. 4 and 5 are views in plan and side elevation respectively of the improved rabble arm. Fig. 6 is a cross section of the arm shown in Fig. 4 on the dotted line *c c*. Figs. 7 and 8 are views in cross section (on the dotted line *d d*) and end elevation respectively of the arm shown in Figs. 4 and 5. Figs. 9 and 10 are views showing the construction of the retaining bars hereinafter described. Figs. 11, 12 and 13 are views illustrating a back tooth of the rabble arm in rear and side elevation and in plan respectively, while Figs. 14, 15 and 16 are similar views illustrating an oblique tooth. Figs. 17, 18 and 19 are views illustrating a front tooth in side and front elevation, and in plan respectively. Figs. 20, 21 and 22 are perspective views of a back, front and oblique tooth respectively. Fig. 23 is a view in cross section of a rabble arm with teeth attached. Fig. 24 is a view in perspective of the inner end of a rabble arm showing portion removed to illustrate the internal construction thereof.

In these drawings, where Figs. 1, and 3 to 10 are drawn to a smaller scale than the other figures, the numeral 1 indicates a hollow rabble shaft, which as shown may pass vertically through a plurality of hearths 2, and be provided above each hearth with a rabble arm 3. When the shaft 1 passes through furnaces having more than one hearth 2, the arms 3 are preferably arranged alternately on opposite sides of the shaft in their order upward as illustrated in Fig. 1.

$1^a$ are perforations in the lower end of the shaft 1 through which air may be admitted for cooling the said shaft, and the arms affixed thereto. The said shaft 1 may be provided with a vertical extension $1^b$ of any desired height in order to induce a free upward draft or current of air passing therethrough, or said current may be created by any well-known mechanical means.

The inner or butt end 4 of each of the rabble arms 3 is flat or horizontal on its top and tapered on its two sides and bottom, to conform with a correspondingly shaped hole 5 in the rabble shaft 1, where the arm engages therewith. The bottom of the hole 5 in the shaft 1 may be as shown given a less inclination than the bottom of the butt end 4 of the rabble arm 3; consequently when the arm is in position in the shaft it will have a certain amount of vertical play, owing to the depth of the small end of the hole 5 being greater than that part of the arm projecting therethrough. This increase of depth in the small end of the hole 5 is utilized when necessary to adjust the arm at the required angle with the shaft by the insertion of a strip or strips of metal, in the said hole above the arm until it is in the desired position. The space 6 between the bottom of the arm and the small end of the hole 5 may be filled with clay or other suitable material to prevent the furnace gases entering the shaft 1 at this point.

The butt end of the arm 3 projects slightly beyond the shaft 1 and is provided with a recess or key-way 7 which is made in its upper side in order to receive a key 8 to retain the arm securely on the shaft. The key 8 is formed with a central recess 8ª which is adapted to engage with or fit within the keyway 7 in such a way that it can only be removed therefrom by an upward blow.

When, from any cause, it is deemed desirable to remove an arm from the furnace the key 8 is knocked out of its key-way 7 when the arm may be removed from the shaft, by the application of force on the protruding end of the arm, which at this point is suitably formed to withstand any force necessary. Should the arm be "burnt on" to the shaft 1 it can be easily loosened by raising its outer end slightly, which action easily breaks the contact formed between the arm and shaft, and allows it to be removed with less force than would be otherwise necessary.

Should it for any reason be desired to remove the shaft 1 from the furnace this can be done without first cooling the latter down, as it is quite obvious that when all arms are withdrawn from it, the shaft can be at once withdrawn through the top of the furnace.

A hole 9 is formed in the top and bottom of that part of the arm 3 which passes through the shaft 1 which shaft is thickened at this point and the vertical passage therethrough made to concur in shape and size with the hole 9 in the arm 3 as shown in Figs. 2 and 2ª.

The arms 3 are hollow and constructed preferably as shown in Figs. 4 and 5, with an internal vertical partition 10 running the greater part of its length and cast integrally therewith. This partition 10 commences at any desired distance from the outer end of the arm and extends vertically down the center till it reaches a point near the butt end 4 thereof, at which point it turns over to the oblique and passes in this manner to the solid tapered end of the arm. The oblique part 11 of the partition 10 passes from one side of the arm to the other at any desired angle and insures a maximum amount of entrance for the air to and outlet for the same from the arm. The partition 10 could obviously be made horizontal for the whole of its length, but the advantage of having the partition vertical is that it makes the arm stronger to bear the stress of its own weight and that of the teeth depending from it. Moreover the obliquity of the partition in the butt end of the arm presents less obstruction to the air readily entering the arm from the shaft than would be the case if the air had to impinge against a surface placed at right angles to its direction of travel.

Each of the rabble arms 3 is provided on its back and front sides and lower edges with a laterally projecting web or flange 12 and 13 respectively. The back flange 12 is provided on its underside with a number of projections 14 which are preferably spaced at regular distances apart, and taper on their bottom and inner sides toward the butt end 4 of the arm. Similar projections 15 are formed on the top of the front web or flange 13. The projections 14 and 15 on the inner ends of the flanges 12 and 13 respectively, besides being directly opposite each other, are larger than and taper in an opposite direction to the remaining projections. These larger projections 14 and 15 are adapted to receive the jaws 17 formed on the top of an oblique tooth 18 (see Fig. 22) which has been designed to throw the ore outwardly from the rabble shaft 1 and prevent the same from banking against and falling down between the sleeve 2ª and the shaft 1 when the arm is in motion. The said oblique tooth 18 is passed over the outer ends of the flanges 12 and 13 and moved inward until it engages with its respective projections 14 and 15 and abuts against the stop pieces 19 at the inner ends of the said flanges. The back teeeth 20 are rectangular in front elevation and are each formed with a jaw 21 projecting forwardly from its upper end. The bottom cheek of the said jaw 21 is formed with a recess 22 which is similar in shape to and adapted to engage with the projections 14 on the bottom of the flange 12 when the teeth are in position thereon. The front teeth 23 are very narrow and project considerably forward each forming practically a shank which connects a cross piece 24 at its lower end to a rearwardly projecting jaw 25 on its upper end. Each of these said jaws 25 has a tapered recess 26 formed in its upper cheek to permit of its engaging with its respective projection 15 on the front flange 13 of the arm. These said projections 15 are so positioned on the flange 13 that the forwardly projecting ends of the front teeth 23 attached thereto will when the rabble arm 3 is in motion describe concentric circles with, and operate the ore between the paths formed by the back teeth 20, as illustrated by the broken lines 3ª, see Fig. 4. The outward thrusting of the ore by the oblique teeth 18 causes the adjacent back and front teeth 20 and 23 respectively to operate a greater depth of ore and consequently a more even distribution of the ore over the hearths is effected thereby.

The projection 15 with which the jaw 25 of the innermost front tooth 23 engages, tapers toward the outer end of the arm and the recess 26 in the upper cheek of said jaw 25 is made to correspond therewith. This said tooth 23 is pushed on to its respective projection 15 from the outer end while the remaining front teeth 23 and all the back teeth 20 are pulled on to their respective projections from the opposite direction.

Thus as the stress to which the front and back teeth 20 and 23 are subjected to, when in operation, is in an outward direction and that of the oblique tooth 18 is in an opposite direction, it will be obvious that the stress only tends to secure them more firmly to their respective projections 14 or 15 on the flanges 12 and 13 of the arms. To affix the back and front teeth in position on the arms the operator passes the jaws on their upper ends over their respective flanges between the projections thereon and then draws them outwardly until they engage with their respective projections, and abut against the stop pieces 27 formed on the opposite side of the flanges to and level with the outer end of the tapered projections. Thus it will be obvious that any one of the back or front teeth 20 and 23 respectively can be removed from the arm 3 without disengaging any of the others therefrom, as is necessary with all existing rabbles.

In order that all the teeth of the rabble arms 3 can be easily and quickly attached to or removed from their respective projections 14 and 15 they are made to fit loosely therewith and their exact working positions on the same are determined by the stops 27 on the flanges 12 and 13. These said stops 27, instead of being on the opposite side of the flanges 12 or 13 to its respective tapered projection 14 or 15 and as shown in Figs. 4 and 5, can be made on or near the large ends of the said projections and the jaws 21 and 25 of the back and front teeth made to engage therewith.

When all the teeth have been placed in their correct positions on the rabble arm 3, they are prevented from shifting therefrom by retaining bars 28 and 29. The inner ends of these bars 28 and 29 are first inserted in recesses 30 formed in the outer ends of the jaws 17 of the oblique tooth 18, and then allowed to fall into their positions when the depending studs 31 thereon abut against that side of the teeth which engage with the smallest ends of the projections 14 or 15, and thus prevent the teeth from disengaging therefrom. The said retaining bars 28 and 29 are kept in position by their own weight and the webs 32 on the back and front teeth 20 and 23 respectively.

It will readily be understood that the front and back teeth 20 and 23 respectively must be some distance apart to insure them performing their functions properly, and that though the drawings show the front teeth only projecting forward it will be obvious that the requisite distance between the said teeth may be obtained by projecting the back teeth to the rear.

After the rabbles have been working in the furnace for a long period the teeth are oftentimes found to "burn on" to the rabble arms, therefore it will be obvious that the tapered projections to which the teeth are affixed will permit of them being easily and quickly removed when it is desired to replace them by new ones.

In cases where it would be inadvisable to allow a circulation of air to pass through the rabble and thereby carry off heat, the conservation of which is desirable the hollow rabble arm 3 may be filled with infusorial earth, asbestos or other non-conducting material. In this case the partition 10 can with advantage extend right to the outer end of the arm and the non-conducting material will effectually prevent the said partition becoming as hot as the outside shell of the rabble arm and thus enable it to better withstand the stresses to which it is subjected when in operation.

The mode of operation is as follows:— Motion is given to the shaft 1 by worm, bevel or other gear found most suitable or convenient with the kind of furnace being used, and as it revolves the teeth 18, 20 and 23 on the rabble arms 3 plow through and distribute the ore over the hearth or hearths 2 of the furnace continuously exposing fresh surfaces of ore to the oxidizing gases passing through the furnace. By reason of their plain vertical sides the back teeth 20 in passing through the ore form it into valleys and ridges thereby exposing a maximum amount of ore surface on a given hearth area. The cross pieces 24 on the front teeth 23 in the following revolution of the rabble arms 3 pass under and through the ore forming the ridges, flattening them out and leaving the surface of the ore more or less level to be again immediately operated on by the back teeth 20 and formed into ridges and valleys. It will thus be understood that each revolution of the rabble arm 3 stirs every particle of ore in its field of operation and exposes a maximum amount of fresh surface of the same to the atmosphere of the furnace.

When the furnace is in operation the air in the shaft 1 and arms 3 becomes heated and naturally seeking to ascend draws cool air through the perforations 1ª in the bottom of the shaft to take its place, thereby creating a continuous upward draft or current of air in the said shaft and arms. The rapidity with which the air passes through the shaft 1 and arms 3 attached thereto increases with the heat of the furnace, and the height to which the shaft is extended.

When the air in its upward travel through the shaft 1 enters the hole 9 in the bottom of a rabble arm 3 it impinges against the oblique portion 11 of the partition 10 and is deflected thereby to the outer end of the said arm where it passes around to the opposite side of the partition 10 and back to the shaft 1, through the hole 9 in the top of the arm, and thence to any arm or arms that may be situated above, where the circuit just described is again completed, the air finally passing up through the shaft extension 1ᵇ to the atmosphere.

Having now fully described and ascertained my said invention and the manner in which it is to be performed, I declare, that what I claim is:—

1. In rabbles for ore roasting furnaces, the combination of a rabble shaft having a tapered hole formed horizontally therethrough, and a rabble arm having a correspondingly tapered butt end exactly fitted in said hole and connected with said shaft.

2. In rabbles for ore roasting furnaces, the combination of a hollow rabble shaft having a tapered hole formed horizontally through a thickened portion thereof, and a hollow rabble arm having a correspondingly tapered butt end fitted in said hole, the bottom side of said hole having a less inclination than the corresponding side of the butt end of the rabble arm, as and for the purpose described.

3. In rabbles for ore roasting furnaces a hollow rabble arm having an internal central partition which is formed obliquely at the butt end of said arm and extends vertically to a point near the outer end of the arm, the butt end of said arm being provided with air inlet and exit holes situated one on each side of the oblique part of the said partition.

4. In rabbles for ore roasting furnaces, a hollow rabble shaft having a tapered hole formed horizontally through a thickened portion thereof, a rabble arm having a correspondingly tapered butt and inserted through said hole, and a key engaged with the projecting end of said arm for retaining the same against displacement.

5. The combination, with a hollow rabble shaft having a tapered hole formed horizontally through a thickened portion thereof, of a hollow rabble arm provided with air inlet and outlet openings, and having a tapered butt end fitting in said hole, a key engaged with said end to hold said arm against displacement, and a longitudinal partition formed vertically in the outer end and obliquely in the butt end of said arm.

6. In rabbles for ore roasting furnaces, the combination with a rabble arm provided with laterally projecting flanges having tapered projections formed thereon, of a series of teeth having recessed jaws engaged with said projections.

7. In rabbles for ore roasting furnaces, a rabble arm having separate series of depending teeth attached to its front and rear edges, and a depending oblique tooth attached to its inner end.

8. A rabble arm having laterally projecting flanges provided with tapered projections, an oblique tooth attached to the projections on the inner end of said flanges, broad rectangular back teeth attached to the projections on the rear flange, and narrow forwardly projecting front teeth attached to the projections on the front flange.

9. In rabbles for ore roasting furnaces the combination with a rabble arm having a back row of teeth rectangular in front elevation, of a front row of teeth having narrow forwardly projecting shanks with cross pieces on their lower ends as and for the purpose described.

In testimony whereof I have signed my name to this specification in the presence of two subscribing witnesses.

ARTHUR VICTOR LEGGO.

Witnesses:
　WALTER SMYTHE BAYSTON,
　FRANK BAYSTON.